United States Patent
Cheng et al.

(10) Patent No.: US 7,470,748 B2
(45) Date of Patent: Dec. 30, 2008

(54) POLYMERIC FIBERS AND FABRICS

(75) Inventors: Chia Y. Cheng, Seabrook, TX (US); G. Allan Stahl, Knoxville, TN (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 475 days.

(21) Appl. No.: 11/193,592

(22) Filed: Jul. 29, 2005

(65) Prior Publication Data

US 2007/0027262 A1 Feb. 1, 2007

(51) Int. Cl.
- *C08L 23/00* (2006.01)
- *C08L 23/04* (2006.01)
- *B28B 3/20* (2006.01)
- *B29C 47/00* (2006.01)

(52) U.S. Cl. ............... 525/191; 525/240; 264/176.1

(58) Field of Classification Search ............ 525/191, 525/240; 264/176.1
See application file for complete search history.

(56) References Cited

U.S. PATENT DOCUMENTS

| | | | |
|---|---|---|---|
| 4,839,228 A | 6/1989 | Jezic et al. | 428/401 |
| 5,199,885 A | 4/1993 | Korsunsky et al. | 439/79 |
| 5,571,619 A | 11/1996 | McAlpin et al. | 428/364 |
| 5,593,768 A | 1/1997 | Gessner | 428/286 |
| 6,231,936 B1* | 5/2001 | Kozimor et al. | 428/34.7 |
| 6,270,891 B1* | 8/2001 | Maugans et al. | 428/364 |
| 6,281,289 B1 | 8/2001 | Maugans et al. | 525/191 |
| 6,329,454 B1* | 12/2001 | Krabbenborg | 524/252 |
| 6,432,340 B1* | 8/2002 | Vassilatos | 264/176.1 |
| 6,657,033 B1 | 12/2003 | Sartori et al. | 526/348.1 |
| 6,720,388 B1* | 4/2004 | Demain | 525/240 |

FOREIGN PATENT DOCUMENTS

WO 95/20931 8/1995

* cited by examiner

*Primary Examiner*—Nathan M Nutter
(74) *Attorney, Agent, or Firm*—Paige Schmidt; Kevin M. Faulkner

(57) ABSTRACT

Polymeric fibers and nonwoven polymeric fabrics having improved softness characteristics are provided. The fibers and fabrics include either a random propylene copolymer or a blend of a polypropylene polymer and a low-density polyethylene polymer. The random propylene copolymer is produced through metallocene-catalyzed and Z-N polymerization and includes from 80 wt. % to 98 wt. % of propylene-derived units and from 2 wt. % to 20 wt. % ethylene-derived units. The low-density polyethylene polymer is also produced through metallocene-catalyzed polymerization and has a melt index of greater than 10 and a molecular weight distribution of 1.5 to 4. The fibers may be produced using a variety of processes including melt blowing, melt spinning, and spunbonding. The fibers may be converted into nonwoven fabrics through conventional techniques.

1 Claim, No Drawings

POLYMERIC FIBERS AND FABRICS

FIELD OF THE DISCLOSURE

This disclosure relates to polymeric fibers and nonwoven fabrics produced from such polymeric fibers.

BACKGROUND INFORMATION

Production and use of polymeric fibers is well known. Polymeric fibers have been widely used to produce a variety of articles such as nonwoven and woven fabrics. Typically, because of processing limitations, such fibers are polypropylene-based. However, such fibers generally produce fabrics that are not soft to the touch and clothing articles produced from such fabrics are uncomfortable to wear.

Various modifications to polymer compositions used to make fibers have been proposed to improve the properties of fabrics produced from the fibers. U.S. Pat. No. 5,199,885 discloses the use of copolymers of propylene and up to 5% ethylene to produce polymeric fibers and fabrics. The copolymers are produced through conventional non-metallocene catalyst polymerization techniques. The copolymers exemplified incorporate 3% ethylene. The '885 Patent discloses use of the copolymers to provide fabrics with broader melting point ranges to promote bonding in laminate structures. The Patent also discloses that the softness of copolymer laminate structures is improved.

U.S. Pat. No. 6,657,033 discloses the use of random copolymers of propylene and alpha olefins other than ethylene for the production of fibers. The reference also discloses that the copolymer may be blended with a HDPE, LDPE, or LLDPE. Metallocene catalyzed polymers are not disclosed. U.S. Pat. No. 5,571,619 discloses the propylene copolymers incorporating an alpha olefin of 5 or more carbon atoms in the production of fibers, fabrics, and films. U.S. Pat. No. 5,571,619 discloses that copolymers of propylene and alpha olefins having four or less carbon atoms are not suitable because of cold flow resistance properties.

U.S. Pat. No. 4,839,228 discloses blending non-metallocene catalyzed polyethylenes with polypropylene to produce fiber compositions. The reference exemplifies the use of LLDPE and lists LDPE and HDPE for inclusion in the blends. Melt indices of 12 to 120 for the polyethylenes are identified. U.S. Pat. No. 6,281,289 discloses the production of polymeric fibers made from blends of polypropylene and LLDPE having melt indices of less than 10. Other references disclosing the use of blends of polypropylene and polyethylenes are U.S. Pat. Nos. 6,281,289; 5,593,768; and PCT Published Application WO 95/20931.

SUMMARY OF THE DISCLOSURE

This disclosure relates to polymeric fibers and woven or nonwoven fabrics produced from such fibers. The fibers and fabrics have improved softness characteristics attributable to the incorporation of certain polymeric components in polymeric compositions of the fibers and fabrics. The fibers and fabrics include either a random propylene copolymer or a blend of a polypropylene polymer and a low-density polyethylene polymer.

One embodiment is a fiber comprising: from 80 wt. % to 98 wt. % of a first component wherein the first component is selected from the group consisting of a propylene homopolymer, a random propylene copolymer, and blends thereof; and from about 2 wt. % to about 20 wt. % of a second component wherein the second component is a low density polyethylene, produced through a metallocene catalyzed polymerization reaction, having a density of 0.86 g/cm3 to 0.90 g/cm3, a melt index greater than 10 g/10 minutes, and a molecular weight distribution of 1.5 to 4.0.

Another embodiment is a fabric comprised of a polymeric composition comprising: from 80 wt. % to 98 wt. % of a first component wherein the first component is selected from the group consisting of a propylene homopolymer, a random propylene copolymer, and blends thereof; and from about 2 wt. % to about 20 wt. % of a second component wherein the second component is a low density polyethylene, produced through a metallocene catalyzed polymerization reaction, having a density of 0.86 g/cm3 to 0.090 g/cm3, a melt index greater than 10 g/10 minutes, and a molecular weight distribution of 1.5 to 4.0.

Another embodiment is a process for preparing fibers by spinning a polymeric composition comprising: from 80 wt. % to 98 wt. % of a first component wherein the first component is selected from the group consisting of a propylene homopolymer, a random propylene copolymer, and blends thereof, and from about 2 wt. % to about 20 wt. % of a second component wherein the second component is a low density polyethylene, produced through a metallocene catalyzed polymerization reaction, having a density of 0.86 g/cm3 to 0.92 g/cm3, a melt index greater than 10 g/10 minutes, and a molecular weight distribution of 1.5 to 4.0.

In any embodiment described herein the process for preparing fibers may be by spinning a polymeric composition comprising at least 90 wt. % of a random propylene copolymer wherein the random propylene copolymer is produced through a metallocene catalyzed polymerization reaction and Z-N catalyzed polymerization reaction.

In any embodiment described herein, the fibers may have a diameter of 0.1 denier to 50 denier per filament.

In any embodiment described herein the fiber may comprise at least 90 wt. % of a random propylene copolymer and wherein the random propylene copolymer is produced through a metallocene catalyzed polymerization reaction.

In any embodiment described herein, the random propylene copolymer may comprise at least 3.5 wt. % of ethylene-derived units and/or may have a molecular weight distribution of 1.5 to 4.0.

In any embodiment described herein, the random propylene copolymer may comprise from 80 wt. % to 94 wt. % of propylene-derived units and from 6 wt. % to 20 wt. % of ethylene-derived units.

In any embodiment described herein, the random propylene copolymer may have a molecular weight distribution of 1.5 to 3.

In any embodiment described here, the random propylene copolymer comprises at least 3.5 wt. % of ethylene-derived units.

Any of the fibers herein can be prepared in nonwoven fabric processes such as spunbond and meltblown processes. They can further be used to prepare laminates of spunbond and meltblown nonwoven fabrics.

In any embodiment described here, the first component may be a propylene homopolymer.

The random propylene copolymer is produced through metallocene or Ziegler Natta catalysis and includes at least 3.5 wt. % ethylene derived units. In one embodiment, the random propylene copolymer includes from about 85 wt. % to 96 wt. % of propylene-derived units and from about 4 wt. % to about 16 wt. % ethylene-derived units. The random copolymer also incorporates a nucleating agent. The polymeric compositions incorporating the random propylene copolymer include at least 90 wt. % of the random propylene copolymer.

The low-density polyethylene polymer which has a density of less than 0.9 g/cm3 is produced through metallocene-catalyzed polymerizations and has a melt index of greater than 10 and a molecular weight distribution of 1.5 to 4. The polymeric compositions incorporating the low density polyethylene may include from about 80 wt. % to 98 wt. % of a propylene homopolymer, a random propylene copolymer, and blends thereof and from 2 wt. % to 20 wt. % of a the low density polyethylene.

The fibers may be produced using a variety of processes including mono-filament or multi-filament spinning, melt blowing, spunbonding and film slitting and fibrillating. Depending on the fiber production process used, the fibers may have diameters ranging from about 0.5 denier to about 50 denier. The fibers may be converted into woven and non-woven fabrics through conventional techniques for processing fibers produced in the various processes.

DETAILED DISCLOSURE

This disclosure relates to polymeric fibers and woven or nonwoven fabrics produced from such fibers. The fibers and fabrics have improved softness characteristics attributable to the incorporation of certain polymeric components in polymeric compositions of the fibers and fabrics. The fibers and fabrics include either a random propylene copolymer or a blend of a polymer polypropylene homopolymer or copolymer and a low-density polyethylene polymer having a density of less than 0.9 g/cm3.

Fiber and Fabric Production Processes

Depending on the application, the fibers described herein may be in the form of continuous filament yarn, monofilaments, staple fiber, or tow. Continuous filament yarn consists of a small number of roughly parallel, continuous, individual filaments of unlimited length held together by a slight twist or by intermingling. Staple fiber is made up of a large number of discontinuous, randomly oriented, individual fibers. It may be subjected to a series of processes, including in spinning to yarn. The precursor to staple fiber is tow, which consists of a large number of roughly parallel, continuous filaments. It is converted by crimping and cutting or breaking into staple.

The fibers described herein may also be monofilaments which are single filaments of yarn which are generally greater in diameter than those present in continuous filament and staple yarn.

The size of the fibers is typically from about 0.5 denier to about 50 denier per filament (dpf). Melt blown fibers may be from about 0.01 denier to 0.15 denier and spunbond fibers may be from about 0.5 denier to about 50 denier per filament in one embodiment. In another embodiment, the spunbond fibers may have sizes from about 1.5 to about 3 denier per filament.

The fibers described herein useful for making the nonwoven and woven fabrics described herein may be produced in a variety of processes. For example, the fibers may be produced by spinning, including melt and solution spinning (including spunbonding), melt blowing, and film slitting and film fibrillating. All of these processes are well known. However, the following provides some additional detail regarding the melt spinning and spunbond processes as well as melt-blown processes.

In melt spinning, a polymeric composition is generally melted using one or more screw extruders. The extruder delivers molten polymeric composition at a constant rate into a filter assembly. In the filter assembly the molten polymeric composition is filtered through a series of sintered or fibrous gauzes or a bed of grade fine refractory material, such as sand or alumina, held in place by metal screens. Filtration removes large solid or gel particles that might otherwise block spinneret holes or, if passed through occupy sufficient cross-sectional area in the fiber to affect its processing or tensile properties. Filtration also provides shearing, and thus can influence rheological behavior of the polymeric composition.

After filtration, the molten polymer passes to the spinneret through a distribution system, arranged to maximize mixing, equalize temperature, and minimize stagnancy. The filter and spinneret are normally mounted in the same assembly, known as a pack. Dynamic mixers, static mixers, or flow inverters are sometimes included in the spinning apparatus to improve the homogeneity of the molten polymer between spinning positions.

Spinnerets for continuous yarn production may have up to about 500 holes, most commonly 50 to 200, per spinneret and those for tow or staple fiber may have thousands. For continuous yarn or staple fiber production, the spinneret holes measure between about 0.3 mm and about 1.0 mm in diameter.

For monofilaments, the spinnerets typically have only a few relatively large holes, from about 0.5 mm to about 4 mm in diameter. The spinneret holes for monofilaments are usually round, but may have other cross sections, e.g., multilobal or rectangular.

Typical extrusion temperatures for the polymeric compositions are from about 200° C. to about 300° C. The actual temperature used is dependent on the molecular weight of the polymers of the polymeric compositions, with higher molecular weight polymers requiring higher temperatures to achieve a sufficiently low melt viscosity for extrusion.

As molten polymeric composition passes through a spinneret hole, it is drawn away and attenuated by a draw-down force applied by a forwarding or windup roll; simultaneously its temperature rapidly decreases. The diameter of the fiber immediately below the hole and before attenuation begins may be larger than the hole diameter. This so-called die swell is due to relaxation of the viscoelastic stress induced in the hole.

In the case of continuous yarn, after spinning the fiber, it is cooled, generally by blowing cool air on the fiber. In the case of monofilaments, because heat removal is more difficult, the fiber is usually quenched by passing it into cold water or on to a cold quench roll immediately after extrusion.

For continuous yarn, the orientation of the spun yarn depends upon the speed at which it is forward spun. Generally, speeds below about 1500 m/min are employed to make spun yarn of low orientation and above about 2500, m/min to make partially oriented yarn.

Fibers having a low orientation must be drawn to a relatively high draw ratio (4-7) to produce so-called fully oriented yarn. Drawing may be carried out as a separate step in which the spun yarn is first wound up onto a bobbin, or it may be integrated with spinning as a spin-draw process in such a way that the yarn is removed from the spinning zone relatively slowly, forwarded to a drawing zone (or two or more successive drawing zones) in which it oriented, and finally wound up at a high speed, e.g., 6000 m/min.

Partly oriented yarn (POY), the feedstock for draw texturing or warp drawing (draw beaming), is usually wound up at speeds of 2500-4000 m/min. spin-draw processes for untextured filament yarns may also be based upon forwarding partly oriented yarn from the spinning zone at speeds of this order, drawing them in line to a draw ratio of 1.5-2, and finally winding up to a higher speed. Integrated spin-draw-texture processes may also be carried out.

In spinning tows for conversion into staple fiber, the numbers of fibers from a single spinneret may be several thousand. The fibers from a large number of individual spinnerets are converged by forwarding them together from capstan rollers as a large tow, which is collected by forwarding it into a transfer can and transported to a separate drawing stage.

Spun bond processes produce continuous filaments of polymeric material. As described in U.S. Pat. No. 4,041,203, spunbond processes involve extruding a molten polymeric material under pressure through a large number of orifices. The resulting continuous filaments are quenched and drawn by any of a number of methods, such as slot draw systems, attenuator guns, or Godet rolls. The continuous filaments are collected as a loose web upon a moving surface, such as a wire mesh conveyor belt. When more than one die is used in line for the purpose of forming a multi-layered fabric, the subsequent webs are collected upon the uppermost surface of the previously formed web. The web is then at least temporarily consolidated, usually by means involving heat and pressure, such as by thermal point bonding. Using this means, the web or layers of webs are passed between two hot metal rolls, one of which has an embossed pattern to impart and achieve the desired degree of point bonding, usually on the order of about 10 to about 40 percent of the overall surface area being so bonded. An overview of the spunbonding may be found in Wadsworth, L. C. and Goswami, B. C., Nonwoven Fabrics: "Spunbonded and Meltblown Processes", proceeding Eighth Annual Nonwovens Workshop, Jul. 30-Aug. 3, 1990, sponsored by TANDEC, University of Tennessee, Knoxville.

A related is the meltblown process. In this process, again, a molten polymeric material is extruded under pressure through orifices in a spinneret or die. High velocity air impinges upon and entrains the filaments as they exit the die. The energy of this step is such that the formed filaments are greatly reduced in diameter and are fractured so that microfibers of a finite length are produced. This differs from the spunbond process in which the continuity of the filaments is preserved. The meltblown process may be used to form either a single layer or a multiple-layer fabric. The process is continuous, that is, the process steps are uninterrupted from extrusion of the filaments to form the first layer until the bonded web is wound into a roll. Methods for producing meltblown fabrics are described in U.S. Pat. No. 4,041,203. An overview of the meltblown process may be obtained from "Melt Blown Process", Melt Blown Technology Today, Miller Freeman Publications, Inc., San Francisco, Calif., 1989, pgs. 7-12.

For additional detail regarding spinning techniques, including long-spinning and short-spinning, see U.S. Pat. No. 6,657,033. For additional information regarding these various types of fiber production techniques, see U.S. Pat. Nos. 5,272,003 and 6,657,033.

Polymeric Compositions

As discussed above, the fibers and fabrics described herein include either a random propylene copolymer or a polymeric blend of a polypropylene polymer component and a low-density polyethylene polymer.

Random Propylene Copolymer

In certain embodiments, the fibers described herein incorporate at least one random propylene copolymer. The random propylene copolymers useful for production of certain embodiments of the fibers described herein are produced through metallocene or Ziegler-Natta catalyzed polymerization. In embodiments in which the polymeric compositions incorporate the random propylene copolymer, the fibers described herein include at least 90 wt. % of the at least one random propylene copolymer.

In one embodiment, the random propylene copolymer includes at least 3.5 wt. % ethylene-derived units. In other embodiments, the random propylene copolymer includes from about 85 wt. % to about 96 wt. % of propylene-derived units and from about 4 wt. % to about 16 wt. % ethylene-derived units. In still other embodiments, the random propylene copolymer includes from about 90 wt. % to about 95 wt. % of propylene-derived units and from about 5 wt. % to about 10 wt. % ethylene-derived units. Please evaluate these ranges and other ranges in this application.

The random copolymers also incorporate at least one nucleating agent. At least one of various nucleating agents may be incorporated into the random copolymer. The concentration of nucleating agent added should be at a level sufficient to provide crystallinity to the random copolymer without having an adverse effect on the desired properties of the films. It is generally desired to utilize at least one nucleating agent to modify the crystal structure and provide a large number of considerably smaller crystals or spherulites.

Suitable nucleating agents include inorganic nucleating agents and organic nucleating agents. Exemplary inorganic nucleating agents include substances such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide and their complexes (alloy), hydrates of an inorganic metal compound such as hydrates of aluminum hydroxide, magnesium hydroxide, dolomite, hydrotalcite, zeolite, calcium hydroxide, barium hydroxide, basic magnesium carbonate, zirconium hydroxide and tin hydroxide, zinc borate, zinc metaborate, barium metaborate, zinc carbonate, magnesium carbonate, calcium carbonate, barium carbonate, kaolin, montmorillonite, bentonite, clay, mica and talc.

Exemplary organic nucleating agents include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are suitable organic nucleating agents. Substituted sorbitol derivatives such as bis (benzylidene) and bis (alkylbenzilidine) sorbitols wherein the alkyl groups contain from about 2 to about 18 carbon atoms may also be selected as useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes.

In certain embodiments, the random copolymer is selected to be product of a metallocene catalyzed polymerization. A metallocene produced random copolymer is generally narrower in molecular weight distribution compared to a conventional Ziegler Natta catalyzed random copolymer. The random propylene copolymers produced through metallocene catalysis exhibit molecular weight distributions that are narrower than conventional random propylene copolymers. In one embodiment, the random propylene copolymers have molecular weight distributions (Mw/Mn) of about 1.5 to about 4.0. In other embodiments, the random propylene copolymers have molecular weight distributions of about 1.5 to about 3. In still other embodiments, the molecular weight distributions are from about 1.5 to about 2.5. Polymers having narrower molecular weight distributions generally may be used more effectively in higher speed spinning fiber production process.

Additionally, the lower crystallinity of the random propylene copolymer provides lower fiber stiffness as measured by modulus.

For purposes of this disclosure, the term "random propylene copolymer" includes polymers that randomly incorporate at least two different monomer units, including propylene units and ethylene units. The random propylene copolymer may include one or more additional different monomer units, other than propylene and ethylene, to form bipolymers and higher polymers, as long as the random propylene copolymer incorporates propylene monomer units and ethylene monomer units in the ranges set forth above.

As discussed, the polymeric compositions incorporating the random propylene copolymer include at least 90 wt. % of the random propylene copolymer. In other embodiments, the polymeric compositions described herein incorporate from about 90 wt. % to about 98 wt. % of the random propylene copolymer. In still other embodiments, the fibers described herein incorporate from about 95 wt. % to about 99 wt. % of the random propylene copolymer.

In one embodiment, the random propylene copolymers described here have a MFR determined in accordance with ASTM D1238, of about 5 to about 200 for spunbond, continuous fiber or staple fibers, and from about 200 to about 2000 for melt blown process. In other embodiments, the random propylene copolymers described here have a MFR, of about 10 to about 100 for spunbond, continuous fiber and staple fibers, and from about 400 to about 2000 for melt blown process. In still other embodiments, the random propylene copolymers described here have a MFR, of about 20 to about 60 for spunbond, continuous fiber and staple fibers, and from about 800 to about 2000 for melt blown process.

LDPE Blends

In certain embodiments, the fibers described herein include a blend of a polypropylene polymer component and a low-density polyethylene polymer component. The low density polyethylene polymer is produced through metallocene-catalyzed polymerization. The propylene polymer component may be a propylene homopolymer, a random propylene copolymer, or a blend of the two types of propylene polymers. In this context, "random propylene copolymer" shall have the meaning set forth above.

In one embodiment, low density polyethylene ("LDPE") component has a density of less than 0.9 g/cm$^3$ and a MWD of about 1.5 to about 4, a melt index greater than 10. In certain embodiments, the LDPE polymers have a density of 0.86 g/cm$^3$ to 0.89 g/cm$^3$ and a MWD of about 1.5 to about 3 or about 2 and/or a melt index of about 15 to about 50. In other embodiments, the LDPE polymers have a density of 0.86 g/cm$^3$ to 0.88 g/cm$^3$.

In one embodiment, the polymeric compositions used to produce the fibers described herein include from about 80 wt. % to about 98 wt. % of the propylene polymer component and from about 2 wt. % to about 20 wt. % of the LDPE component. In other embodiments, the fibers include from about 90 wt. % to about 97 wt. % of the propylene polymer component and from about 3 wt. % to about 10 wt. % of the LDPE component. In still other embodiments, the fibers include from about 92 wt. % to about 95 wt. % of the propylene polymer component and from about 5 wt. % to about 8 wt. % of the LDPE component.

In certain embodiments, the melt flow rate (MFR) of the propylene component is from about 10 to about 100. In other embodiments, the melt flow rate of the propylene component is from about 20 to about 50.

To produce the LDPE blend compositions described herein, the propylene component and the LDPE maybe pre-blended in solid form and then feed into an extruder. Alternatively, the propylene component and the LDPE may be melt blended prior to entry into an extruder. If the dry blend of propylene component and LDPE are used, the spinning extruder should have a good mixing screw to achieve good mixing of both components in the extruder. Otherwise, spinning difficulties may result due to non-uniformity of the melt delivered to the spinnerette.

Additives

The polymeric compositions of the fibers described herein may also include a variety of additives. For example, the compositions may incorporate commonly employed additives such as slip gents, antistatic agents, flame retardants, fillers, nucleating agents, pigments, anti-soiling agents.

Uses of Fibers

Fibers may be used in various types of applications including yarns, tows, nonwoven fabrics and woven fabrics. Fabrics made from the fibers described herein are softer than fabrics made from conventional fibers. Fabrics made from the fibers described herein may be used in a variety of end-use applications, including consumer products, hygiene products, medical products, etc.

In one embodiment, the polymeric compositions and fibers described herein may be used to produce spunbond fabric and melt blown fabric, or in a 3-layer laminated construction commonly referred to as SMS (spunbond-melt blown-spunbond). The two outer layers are spunbonded fabric and the inner layer is a melt blown fabric. The inner melt blown layer provides a barrier against fluids. SMS fabrics are frequently used in medical-related applications, particularly in products for use in operating rooms. Exemplary operating room products are gowns, drapes, sterile wraps, footcovers, towels, and related articles.

Other exemplary products that may be produced from fabrics made from the fibers described herein include feminine care products, diapers and incontinence products, in which the top sheet consists of a spunbonded, melt blown fabric prepared from the polymeric compositions and fibers described herein.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

The invention claimed is:

1. A process for preparing fibers by spinning a polymeric composition consisting of:
   (i) from 80 wt. % to 98 wt. % of a random propylene copolymer comprising from 80 wt. % to 94 wt. % of propylene-derived units and from 6 wt. % to 20 wt. % of ethylene-derived units; and
   (ii) from about 2 wt. % to about 20 wt. % of a low density polyethylene, produced through a metallocene catalyzed polymerization reaction, having a density of 0.86

$g/cm^3$ to 0.92 $g/cm^3$, a melt index of from 15 to 50 g/10 minutes, and a molecular weight distribution of 1.5 to 4.0, wherein the spinning is accomplished by first melting the composition at from 200 to 300° C. in an extruder, delivering the molten composition at a constant rate into a filter assembly to filter the molten polymeric composition followed by passing the molten polymer to one or more spinnerets having spinneret holes; wherein as molten polymeric composition passes through the spinneret holes, the forming fiber is drawn away and attenuated by a draw-down force applied by a forwarding or windup roll at a rate of greater than 2500 m/min.

* * * * *